(12) United States Patent
Tamura et al.

(10) Patent No.: US 6,200,042 B1
(45) Date of Patent: *Mar. 13, 2001

(54) PARTS-MOUNTED MEMBER AND METHOD OF MOUNTING PARTS

(75) Inventors: Kazushige Tamura, Sagamihara; Jyoji Wada, Yokohama, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,489

(22) Filed: Jan. 20, 1999

(30) Foreign Application Priority Data

Jan. 26, 1998 (JP) .................................................. 10-012251

(51) Int. Cl.⁷ ..................................................... G03B 17/00
(52) U.S. Cl. ............................................................. 396/427
(58) Field of Search ............................. 396/28, 419, 420, 396/422, 427, 428

(56) References Cited

U.S. PATENT DOCUMENTS

| 3,550,519 | * | 12/1970 | Lewis | 396/422 |
| 3,833,916 | * | 9/1974 | Van Der Meer | 396/419 |
| 4,091,402 | * | 5/1978 | Siegel | 396/422 |
| 4,255,036 | * | 3/1981 | Pincetich | 396/422 |
| 4,733,259 | * | 3/1988 | Ng | 396/419 |
| 5,128,701 | * | 7/1992 | Hampton | 396/420 |
| 5,181,120 | * | 1/1993 | Hickey et al. | 396/373 |
| 5,627,616 | | 5/1997 | Sergeant | 396/427 |
| 5,708,890 | * | 1/1998 | Nakano | 396/428 |
| 5,835,807 | * | 11/1998 | Brock | 396/419 |
| 5,852,754 | * | 12/1998 | Schneider | 396/427 |

FOREIGN PATENT DOCUMENTS

| 2297123A | 7/1996 | (DE) . |
| 0122241A1 | 10/1984 | (EP) . |
| 0807878A1 | 4/1997 | (EP) . |
| 2646248A | 10/1990 | (FR) . |
| 5-41824 | 2/1993 | (JP) . |
| WO 95/35624 | 12/1995 | (WO) . |

* cited by examiner

Primary Examiner—David M. Gray
(74) Attorney, Agent, or Firm—Louis Woo

(57) ABSTRACT

A parts-mounted member includes plural portions having different surfaces respectively on which parts are mounted. The portions are rotatably connected to each other. The portions are fixed to each other and the surfaces thereof are held in a fixed angular relation after the parts are mounted on the surfaces. The portions may include first and second portions which are held perpendicular to each other.

5 Claims, 3 Drawing Sheets

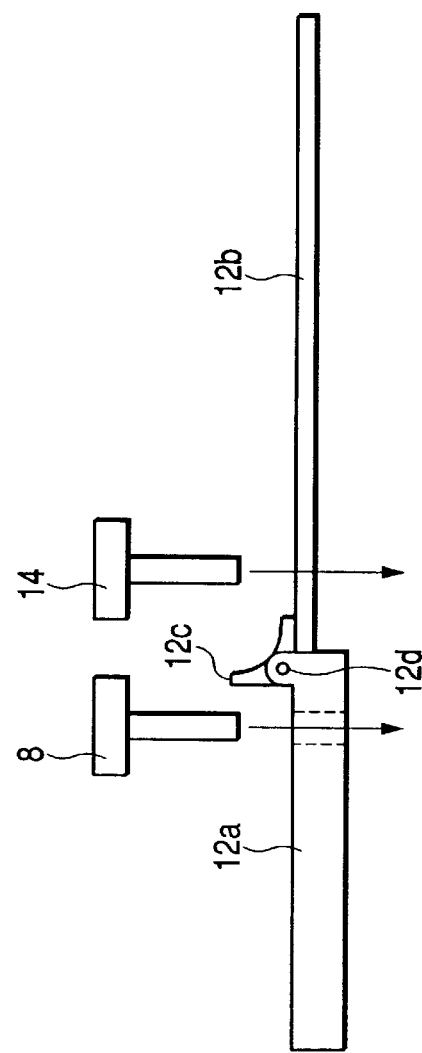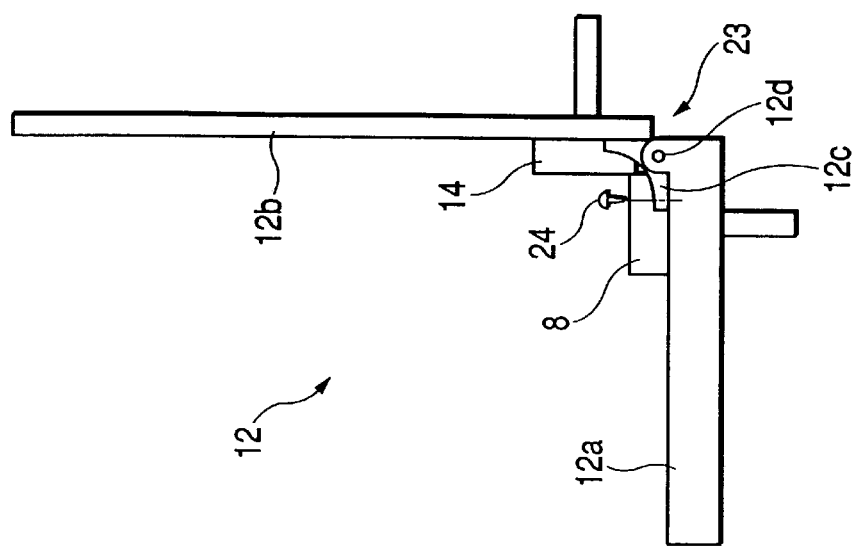

PARTS-MOUNTED MEMBER AND METHOD OF MOUNTING PARTS

BACKGROUND OF THE INVENTION

1. Field of the Invention

This invention relates to a parts-mounted member for various apparatuses such as a monitor camera, a mechanical apparatus, and an electronic apparatus. This invention also relates to a method of mounting parts of various apparatuses such as a monitor camera, a mechanical apparatus, and an electronic apparatus.

2. Description of the Related Art

In general, stores and banks use monitor cameras. A monitor camera of a fixed type covers a limited and fixed area. There is a panning mechanism for rotating a monitor camera about a vertical axis. In addition, there is a tilting mechanism for rotating a monitor camera about a horizontal axis. It is known to equip a monitor camera with both a panning mechanism and a tilting mechanism to widen the area covered thereby.

In a known compact monitor camera, a camera section, a panning mechanism, and a tilting mechanism are collected in a narrow space separate from a power supply.

Japanese patent application Toku-Hyo-Hei 9-502331 discloses a prior-art compact monitor camera. A method of making the prior-art compact monitor camera has many steps. Assembling the prior-art compact monitor camera takes a relatively long time.

SUMMARY OF THE INVENTION

It is a first object of this invention to provide a member on which parts are easily mounted.

It is a second object of this invention to provide a method of easily mounting parts.

A first aspect of this invention provides a parts-mounted member comprising plural portions having different surfaces respectively on which parts are mounted; means for rotatably connecting the portions to each other; and means for fixing the portions to each other and holding the surfaces thereof in a fixed angular relation after the parts are mounted on the surfaces.

A second aspect of this invention is based on the first aspect thereof, and provides a parts-mounted member wherein the portions include first and second portions which are held perpendicular to each other by the fixing means.

A third aspect of this invention provides a parts-mounted member for a monitor camera having a camera section, a tilting mechanism for rotating the camera section in a horizontal axis, and a panning mechanism for rotating the camera section in a vertical axis. The parts-mounted member comprises a vertical portion and a horizontal portion on which parts of the tilting mechanism and the panning mechanism are mounted; a hinge for rotatably connecting the vertical portion and the horizontal portion to each other; and means for fixing the vertical portion and the horizontal portion to each other after the parts are mounted thereon.

A fourth aspect of this invention provides a method of mounting parts which comprises the steps of preparing plural portions having different surfaces respectively on which parts are to be mounted; rotatably connecting the portions to each other; holding the surfaces of the portions in substantially a common flat plane; mounting the parts on the surfaces of the portions while the surfaces of the portions are held in substantially the common flat plane; rotating the portions relative to each other out of the common flat plane after the parts are mounted on the surfaces; and fixing the portions to each other and holding the surfaces thereof in a fixed angular relation after the parts are mounted on the surfaces and the portions are rotated relative to each other out of the common flat plane.

A fifth aspect of this invention is based on the fourth aspect thereof, and provides a method wherein the mounting step comprises mounting the parts on the surfaces of the portions in a same direction.

BRIEF DESCRIPTION OF THE DRAWINGS

FIG. 3 is a diagram of a main frame in FIG. 2 on which parts have been mounted.

FIG. 4 is a diagram of the main frame in FIG. 2 on which parts are being mounted.

DESCRIPTION OF THE PREFERRED EMBODIMENT

A prior-art monitor camera will be explained hereinafter for a better understanding of this invention.

Figure 1:
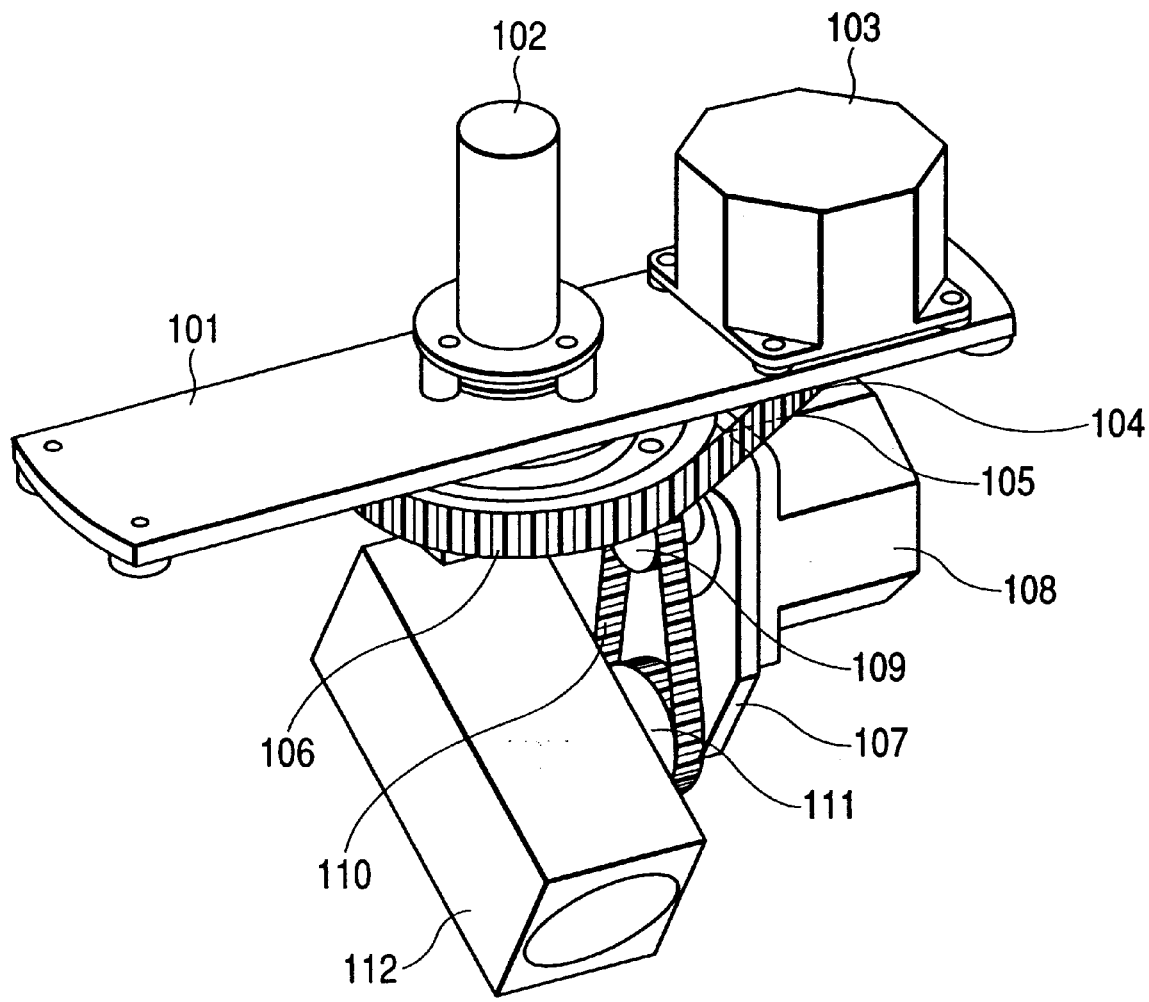
FIG. 1 is a perspective view of a prior-art monitor camera.

FIG. 1 shows a prior-art monitor camera disclosed in Japanese patent application Toku-Hyo-Hei 9–502331. The prior-art monitor camera includes a panning mechanism and a tilting mechanism. With reference to Fig. 1, the panning mechanism includes a panning motor base 101 which is fixed to a camera housing placed in a ceiling. A slip ring 102 is provided between the housing and the panning motor base 101. The slip ring 102 enables electrical connection to a camera section, the tilting mechanism, and an electronic circuit board placed in the housing. A panning motor 103 is provided on the base 101. The panning motor 103 has a rotatable shaft to which a pulley 104 is fixed. A timing belt 105 is provided between the pulley 104 and a pulley 106 attached to a rotatable shaft of the slip ring 102.

The tilting mechanism includes an inverted-L-shaped tilting motor base 107 which has a horizontal portion fixed to the pulley 106. The tilting motor base 107 also has a vertical portion on which a tilting motor 108 is provided. The tilting motor 108 has a rotatable shaft to which a pulley 109 is attached. A timing belt 110 is provided between the pulley 109 and a pulley 111 supported on the tilting motor base 107. A camera 112 is attached to a rotatable shaft of the pulley 111.

In the prior-art monitor camera of FIG. 1, the panning mechanism and the tilting mechanism are covered with a transparent or semitransparent dome.

As the shaft of the panning motor 103 rotates, the pulley 104 rotates and the timing belt 105 moves so that the pulley 106 rotates. Since the tilting motor base 107 is fixed to the pulley 106, the tilting motor base 107 rotates in accordance with the rotation of the pulley 106. The rotation of the tilting motor base 107 causes a turn of the camera 112 about a vertical axis. In this way, the camera 112 is panned.

As the shaft of the tilting motor 108 rotates, the pulley 109 rotates and the timing belt 110 moves so that the pulley 111 rotates. Since the camera 112 is fixed to the pulley 111, the camera 112 rotates about a horizontal axis in accordance with the rotation of the pulley 111. In this way, the camera 112 is tilted.

An image taken by the camera 112 is converted into a digital signal. The digital signal is transmitted to an external display through the slip ring 102.

In the prior-art monitor camera of FIG. 1, the tilting motor base 107 is made into an inverted-L shape to enable the camera 112 to tilt and pan. The tilting motor 108 and other parts are connected to the tilting motor base 107. The attachment of parts to the horizontal portion of the tilting motor base 107 and the attachment of parts to the vertical portion thereof are implemented in different directions respectively. Thus, assembling the prior-art monitor camera of FIG. 1 takes a relatively long time, and automatic attachment of the parts to the tilting motor base 107 tends to be difficult.

EMBODIMENT OF THE INVENTION

Figure 2:
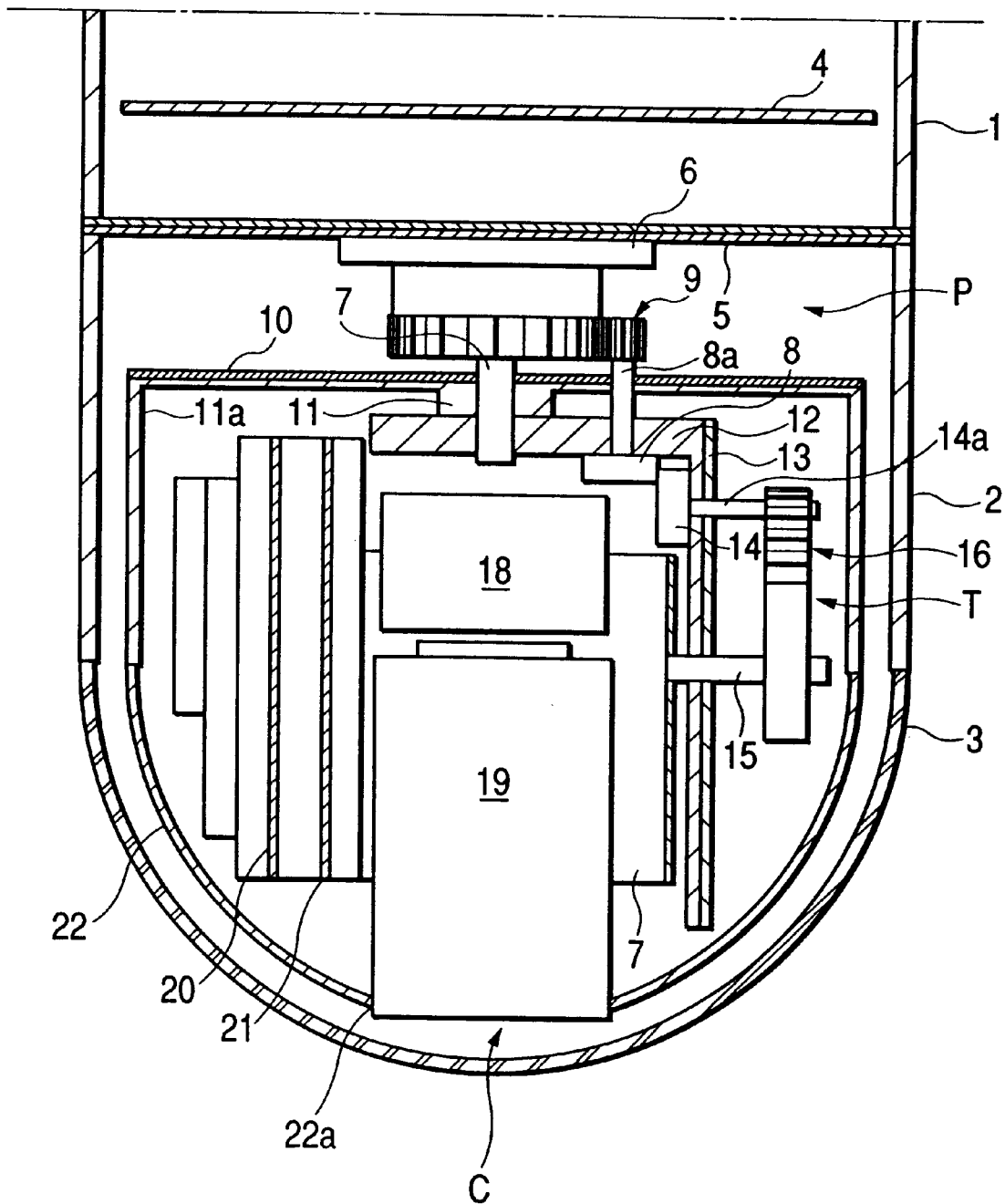
FIG. 2 is a sectional view of a monitor camera according to an embodiment of this invention.

FIG. 2 shows a monitor camera according to an embodiment of this invention. With reference to FIG. 2, the monitor camera includes a power supply portion 1 having a cylindrical outer shell made of resin and attached to a ceiling. A barrel portion 2 is detachably and coaxially connected to the power supply portion 1. The barrel portion 2 has cylindrical outer walls made of resin. A hemispherical dome cover 3 made of transparent resin is coaxially attached to the barrel portion 2. The power supply portion 1, the barrel portion 2, and the dome cover 3 compose a camera housing or a camera casing.

A power supply circuit board 4 is placed within the power supply portion 1. The board 4 supports a power supply circuit which is connected to a commercial power supply. A coaxial cable for transmitting a video signal and a control signal is connected to the power supply circuit board 4. The coaxial cable leads to an external display.

A panning mechanism P, a tilting mechanism T, and a camera section C are placed in the barrel portion 2 and the dome cover 3.

The panning mechanism P includes a slip ring 6 and a gear train 9. The slip ring 6 is connected to a bottom plate 5 of the barrel portion 2. The slip ring 6 is provided with a panning shaft 7. The panning shaft 7 extends vertical or axially with respect to the barrel portion 2. The gear train 9 is connected between the panning shaft 7 and a rotatable shaft 8a of a panning motor 8.

The gear train 9 includes first and second intermediate gears, a worm, and a worm gear. The first intermediate gear is fixed to the shaft 8a of the panning motor 8. The second intermediate gear is fixed to a rotatable intermediate shaft extending perpendicular to the shaft 8a of the panning motor 8. The second intermediate gear is connected to the first intermediate gear. The worm is fixed to the intermediate shaft. The worm gear which meshes with the worm is mounted on the panning shaft 7. The panning shaft 7 extends perpendicular to the intermediate shaft. The panning shaft 7 is parallel to the shaft 8a of the panning motor 8.

A servo circuit board 10 is rotatably mounted on the panning shaft 7. An inverted-L-shaped main frame 12 has a horizontal portion which is rotatably mounted on the panning shaft 7 by a rotation plate 11. The main frame 12 can rotate about the panning shaft 7. The servo circuit board 10 may be supported by the rotation plate 11.

The main frame 12 has a vertical portion to which a motor drive circuit board 13 is fixed. In addition, a tilting motor 14 is provided on the vertical portion of the main frame 12. A tilting shaft 15 is rotatably supported by the vertical portion of the main frame 12 at a position distant from a rotatable shaft 14a of the tilting motor 14. The tilting shaft 15 extends horizontally or radially with respect to the barrel portion 2. A gear train 16 is provided between the tilting shaft 15 and the shaft 14a of the tilting motor 14.

The gear train 16 includes first and second intermediate gears, a worm, and a worm gear. The first intermediate gear is fixed to the shaft 14a of the tilting motor 14. The second intermediate gear is fixed to a rotatable intermediate shaft extending perpendicular to the shaft 14a of the tilting motor 14. The second intermediate gear is connected to the first intermediate gear. The worm is fixed to the intermediate shaft. The worm gear which meshes with the worm is fixed to the tilting shaft 15. The worm gear has a sectorial shape. The tilting shaft 15 extends perpendicular to the intermediate shaft. The tilting shaft 15 is parallel to the shaft 14a of the tilting motor 14.

The tilting shaft 15 is attached to a lens drive circuit board 17. An imager unit 18 and a lens unit 19 composing the camera section C are supported by the lens drive circuit board 17. The imager unit 18 includes a CCD array. The lens unit 19 includes a plurality of lenses. In addition, a digital circuit board 20 and a CCD drive circuit board 21 are fixed to the lens drive circuit board 17. Support members 11a extend axially from four regions of the outer edge of the rotation plate 11. An inner dome 22 smaller than the dome cover 3 and extending inward thereof are attached to the support members 11a. The inner dome 22 is made of semitransparent or opaque resin. The inner dome 22 has an elongated opening 22a for allowing rotation of the lens unit 19 about a horizontal axis.

The power supply circuit board 4 and the servo circuit board 10 are electrically connected via the slip ring 6. The servo circuit board 10, the motor drive circuit board 13, and the CCD drive circuit board 21 are connected via flexible cables. The CCD drive circuit board 21, the digital circuit board 20, and the lens drive circuit board 17 are connected via flexible cables.

A memory and a CPU are provided on the digital circuit board 20. The memory is previously loaded with a control program for the CPU. The CPU operates in accordance with the control program. Operation of the monitor camera of FIG. 2 is controlled by the CPU on the basis of the control program.

A description will be given of the operation of the monitor camera of FIG. 2. In the panning mechanism P, as the shaft 8a of the panning motor 8 rotates, the gear train 9 operates and the main frame 12 rotates about the panning shaft 7. The camera section C rotates in accordance with the rotation of the main frame 12. The camera section C can continuously rotate about a vertical axis through an angular range of 360 degrees.

In the tilting mechanism T, as the shaft 14a of the tilting motor 14 rotates, the gear train 16 operates and the tilting shaft 15 rotates. The lens drive circuit board 17 and the camera section C rotate in accordance with the rotation of the tilting shaft 15. The camera section C can rotate about a horizontal axis between a horizontally facing position and a downwardly facing position through an angular range of 90 degrees.

In the case where the camera section C is required to rotate about a horizontal axis through an angle of 180 degrees, the camera section C is moved by the tilting mechanism T from the horizontally facing position to the downwardly facing position, and is then rotated by the panning mechanism P by an angle of 180 degrees. Subsequently, the camera section C is moved by the tilting mechanism T from the downwardly facing position to the horizontally facing position.

Each time tilting movement or panning movement of the camera section C is implemented, a lens drive circuit provided on the board 17 activates an auto-focusing function and a zooming function by which the camera section C is subjected to a focusing process and a zooming process.

A scene image is formed on the imager unit 18 via the lens unit 19. The imager unit 18 is controlled by a CCD drive circuit provided on the board 21. The scene image is converted by the imager unit 18 into an analog electric video signal. The analog electric video signal is converted into a digital video signal by an analog-to-digital conversion circuit provided on the board 20. The digital video signal is transmitted via the servo circuit board 10 and the slip ring 6 to the power supply circuit board 4. A circuit provided on the board 4 superimposes the digital video signal and a control signal. The superimposition-resultant signal is transmitted from the power supply circuit board 4 to the external display via the coaxial cable.

The external display is combined with a remote control unit (a remote operation unit). A control signal can be transmitted from the remote control unit to the power supply board 4 via the coaxial cable. The panning angle and the tilting angle of the camera section C can be arbitrarily set in accordance with operation of the remote control unit. The zooming magnification in the lens unit 19 can be arbitrarily chosen in accordance with operation of the remote control unit.

As shown in FIG. 3, the main frame 12 has a horizontal portion 12a and a vertical portion 12b which are rotatably connected to each other by a hinge 23. The hinge 23 includes a bracket 12c fixed to a lower end of the vertical portion 12a, and a pin 12d fixed to the horizontal portion 12a. The bracket 12c is rotatably connected to the pin 12d. During the assembly of the monitor camera of FIG. 2, after parts are mounted on the main frame 12, the horizontal portion 12a and the vertical portion 12b thereof are set in a predetermined perpendicular positional relation. Specifically, the bracket 12c is fixed to the horizontal portion 12a by a screw 24 while the horizontal portion 12a and the vertical portion 12b are held perpendicular to each other.

During the assembly of the monitor camera of FIG. 2, the panning motor 8 and the tilting motor 14 are connected to the main frame 12 as follows. First, as shown in FIG. 4, the horizontal portion 12a and the vertical portion 12b of the main frame 12 are placed in a substantially a common flat plane before the bracket 12c is fixed to the horizontal portion 12a by the screw 24. While the horizontal portion 12a and the vertical portion 12b are held in the substantially common flat plane, the panning motor 8 and the tilting motor 14 are connected to the main frame 12 in the same direction. Preferably, the panning motor 8 and the tilting motor 14 are automatically mounted on the main frame 12 by a robot. Thus, assembling the monitor camera of FIG. 2 takes a shorter time, and automatic attachment of parts to the main frame 12 is easily implemented. After the panning motor 8 and the tilting motor 14 are mounted on the main frame 12, the vertical portion 12b is rotated relative to the horizontal portion 12a until the main end surface of the bracket 12c contacts the horizontal portion 12a. The vertical portion 12b is perpendicular to the horizontal portion 12a when the main end surface of the bracket 12c is in contact with the horizontal portion 12a. Under this condition, the bracket 12c is fixed to the horizontal portion 12a by the screw 24.

The main frame 12 may be modified into a structure suited for use in an apparatus other than the monitor camera as long as the structure has a plurality of surfaces with different angles respectively.

The main frame 12 may be modified into a U-shaped structure having three surfaces. In this case, members (portions) of the U-shaped structure are connected by hinges.

The main frame 12 may be modified into a tubular structure having four surfaces. In this case, members (portions) of the tubular structure are connected by hinges.

The main frame 12 may be modified into a structure having five or more surfaces.

As previously indicated, the horizontal portion 12a and the vertical portion 12b of the main frame 12 are fixed to each other by the screw 24 after the parts (for example, the panning motor 8 and the tilting motor 14) are mounted on the main frame 12. Alternatively, the horizontal portion 12a and the vertical portion 12b of the main frame 12 may be fixed to each other by a fitting arrangement or another fixing arrangement. The horizontal portion 12a and the vertical portion 12b of the main frame 12 may be fixed to another member.

Preferably, the main frame 12 is made of metal such as aluminum. The main frame 12 may be made of synthetic material such as plastic-based material. The main frame 12 may have a plastic board on which an electric circuit is printed. The hinge 23 may have thin walls. Portions of the hinge 23 may be integral with the horizontal portion 12a and the vertical portion 12b of the main frame 12.

What is claimed is:

1. A motor driven parts-mounted member comprising:

plural portions having different surfaces respectively on which parts are mounted, at least one of said portions having mounted thereon motor means for driving said parts-mounted member;

means for rotatably connecting the portions to each other; and means for fixing the portions to each other and holding the surfaces thereof in a fixed angular relation after the parts are mounted on the surfaces.

2. A parts-mounted member as recited in claim 1, wherein the portions include first and second portions which are held perpendicular to each other by the fixing means.

3. A parts-mounted member for a monitor camera having a camera section, a tilting mechanism for rotating the camera section in a horizontal axis, and a panning mechanism for rotating the camera section in a vertical axis, the parts-mounted member comprising:

a vertical portion and a horizontal portion on which parts of the tilting mechanism and the panning mechanism are mounted;

a hinge for rotatably connecting the vertical portion and the horizontal portion to each other; and means for fixing the vertical portion and the horizontal portion to each other after the parts are mounted thereon.

4. A method of mounting parts, comprising the steps of:

preparing plural portions having different surfaces respectively on which parts are to be mounted;

rotatably connecting the portions to each other;

holding the surfaces of the portions in a common flat plane;

mounting the parts including at least one motor means for moving said portions on the surfaces of the portions while the surfaces of the portions are held in the common flat plane;

rotating the portions relative to each other out of the common flat plane after the parts are mounted on the surfaces; and fixing the portions to each other and holding the surfaces thereof in a fixed angular relation after the parts are mounted on the surfaces and the portions are rotated relative to each other out of the common flat plane.

5. A method as recited in claim 4, wherein the mounting step comprises mounting the parts on the surfaces of the portions in a same direction.

* * * * *